(12) United States Patent
Towne, III

(10) Patent No.: US 8,701,615 B2
(45) Date of Patent: Apr. 22, 2014

(54) ANTI-COGGING APPARATUS AND METHODS FOR REDUCING COGGING OF ROTATING SHAFT

(76) Inventor: Raymond A. Towne, III, Westland, MI (US)

( * ) Notice: Subject to any disclaimer, the term of this patent is extended or adjusted under 35 U.S.C. 154(b) by 202 days.

(21) Appl. No.: 13/234,858

(22) Filed: Sep. 16, 2011

(65) Prior Publication Data

US 2012/0067317 A1     Mar. 22, 2012

Related U.S. Application Data

(60) Provisional application No. 61/403,547, filed on Sep. 18, 2010.

(51) Int. Cl.
  *F02B 75/06* (2006.01)
  *F16F 15/14* (2006.01)

(52) U.S. Cl.
  USPC ............... 123/192.1; 123/192.2; 74/574.1

(58) Field of Classification Search
  USPC ........... 123/192.1, 192.2; 310/156.35, 400.23
  See application file for complete search history.

(56) References Cited

U.S. PATENT DOCUMENTS

| | | | | |
|---|---|---|---|---|
| 3,293,939 A | * | 12/1966 | Brown | ............... 74/574.1 |
| 4,151,431 A | | 4/1979 | Johnson | |
| 4,858,044 A | * | 8/1989 | Crapo | ............... 360/99.08 |
| 5,455,474 A | | 10/1995 | Flynn | |
| 5,572,962 A | * | 11/1996 | Riley | ............... 123/90.16 |
| 6,246,561 B1 | | 6/2001 | Flynn | |
| 6,946,938 B1 | | 9/2005 | Pedersen | |
| 7,248,006 B2 | * | 7/2007 | Bailey et al. | ............... 318/400.4 |
| 7,265,471 B2 | | 9/2007 | Sprain | |
| 7,327,061 B2 | | 2/2008 | Rogala | |
| 7,342,623 B2 | * | 3/2008 | Ishizaki | ............... 349/114 |
| 7,479,722 B2 | * | 1/2009 | Takeuchi et al. | ............... 310/113 |
| 7,737,596 B2 | | 6/2010 | Boucher et al. | |
| 2003/0071530 A1 | | 4/2003 | Takahashi | |
| 2003/0080641 A1 | | 5/2003 | Ando et al. | |
| 2005/0029888 A1 | | 2/2005 | Inayama et al. | |

FOREIGN PATENT DOCUMENTS

WO   WO 2008-089536   7/2008

OTHER PUBLICATIONS

International Search Report for International Application No. PCT/US2012/055015 mailed Feb. 28, 2013.
Written Opinion of the International Searching Authority for International Application No. PCT/US2012/055015 mailed Feb. 28, 2013.

* cited by examiner

*Primary Examiner* — Rinaldi Rada
*Assistant Examiner* — Syed O Hasan
(74) *Attorney, Agent, or Firm* — Harness, Dickey & Pierce, P.L.C.

(57) ABSTRACT

An anti-cogging apparatus improves rotation of a rotatable shaft about an axis. The shaft has a cyclical cogging torque acting thereon in a first direction. The anti-cogging apparatus includes a first anti-cogging member and a second anti-cogging member that rotate relative to each other in concert with rotation of the shaft, and the anti-cogging members interact to provide an anti-cogging torque to the shaft in a second direction to at least partially offset the cogging torque.

20 Claims, 14 Drawing Sheets

US 8,701,615 B2

ANTI-COGGING APPARATUS AND METHODS FOR REDUCING COGGING OF ROTATING SHAFT

CROSS-REFERENCE TO RELATED APPLICATIONS

This application claims the benefit of U.S. Provisional Application No. 61/403,547, filed on Sep. 18, 2010. The entire disclosure of the above application is incorporated herein by reference.

FIELD

The present disclosure relates to an anti-cogging apparatus and, more particularly, to an anti-cogging apparatus and methods for reducing cogging of a rotating shaft.

BACKGROUND

This section provides background information related to the present disclosure which is not necessarily prior art.

Many machines (e.g., electric motors) include a rotating shaft to which torque is applied. In an electric motor, for instance, the active elements produce interacting magnetic fields that turn the machine's rotor and, thus, the shaft of the motor.

Such machines can also experience cogging. For instance, in the electric motor, passive interaction between the magnetic elements of the stator and rotor can cause cogging that sequentially and cyclically applies positive torque (aiding rotation of the shaft) and negative torque (hindering rotation of the shaft). The cogging torque can cause undesirable vibrations of the motor and can be especially noticeable at low rotational speeds.

Other machines, such as a cam system, experience cogging loads as well. For instance, some valve systems rotate a shaft to cam a valve open against the biasing force of a spring, wherein further rotation of the shaft allows the spring to bias the valve back closed. Thus, the spring supplies a negative cogging torque to the shaft (i.e., in a direction opposing rotation of the shaft) as the valve opens, and the spring supplies a positive cogging torque to the shaft (i.e., in the same direction as rotation of the shaft) as the valve closes. This cogging torque repeats cyclically as the shaft rotates about its axis.

Similarly, in an internal combustion engine, the crank shaft rotates to actuate a piston in an engine cylinder. As the volume in the cylinder is reduced and pressure increases therein (i.e., during the compression cycle), the crank shaft can experience a resultant negative cogging torque. Conversely, as the volume is increased and pressure decreases therein, the crank shaft can experience a resultant positive cogging torque. Cogging torque can be especially noticeable if combustion is not actually occurring (e.g., during engine startup, where one or more cylinders are deactivated, etc.).

SUMMARY

This section provides a general summary of the disclosure, and is not a comprehensive disclosure of its full scope or all of its features.

An apparatus that improves rotation of a rotatable shaft is disclosed. The rotatable shaft has a cyclical cogging torque acting thereon in a first direction. The apparatus includes a support member that is adjacent the rotatable shaft, and the rotatable shaft is operable to rotate relative to the support member. The apparatus also includes a first anti-cogging member and a second anti-cogging member that is coupled to the rotatable shaft for rotation therewith. The apparatus also includes a cam surface that is included on one of the first and second members. Moreover, the apparatus includes an abutment member that is coupled to the other of the first and second members. The abutment member is operable to abut against the cam surface to provide an anti-cogging torque to the rotatable shaft in a second direction that opposes the first direction to at least partially offset the cogging torque.

Also, an apparatus that improves rotation of a rotatable shaft about an axis is disclosed. The rotatable shaft has a cyclical cogging torque acting thereon in a first direction. The apparatus includes a first support member that is coupled to the rotatable shaft for rotation therewith and a second support member that is adjacent the first support member. The first support member is operable to rotate relative to the second support member. A plurality of first magnetic members is coupled to one of the first and second support members, and the plurality of first magnetic members includes at least one inner magnetic member disposed at a first radial distance from the axis and at least one outer magnetic member disposed at a second radial distance from the axis. The apparatus also includes a second magnetic member coupled to the other of the first and second support members. The second magnetic member is disposed at a third radial distance from the axis, which is greater than the first radial distance and less than the second radial distance. The second magnetic member is operable to magnetically interact with the at least one inner magnetic member and the at least one outer magnetic member to provide an anti-cogging torque to the rotatable shaft in a second direction that opposes the first direction to at least partially offset the cogging torque.

Moreover, an apparatus that improves rotation of a rotatable shaft about an axis is disclosed. The rotatable shaft has a cyclical cogging torque acting thereon in a first direction. The apparatus includes a first support member that is coupled to the rotatable shaft for rotation therewith and a second support member that is adjacent the first support member. The first support member is operable to rotate relative to the second support member. The apparatus also includes a first magnetic member coupled to one of the first and second support members and a second magnetic member coupled to the other of the first and second support members. The second magnetic member is operable to magnetically interact with the first magnetic member to provide an anti-cogging torque to the rotatable shaft in a second direction that opposes the first direction to at least partially offset the cogging torque. Furthermore, the apparatus includes a controller that controls and varies an amount of the anti-cogging torque provided to the rotatable shaft.

Still further, a method of improving rotation of a rotatable shaft about an axis is disclosed. The rotatable shaft has a cyclical cogging torque acting thereon in a first direction. The method includes rotating the shaft to cause relative rotation between a first magnetic member and a second magnetic member. The second magnetic member is operable to magnetically interact with the first magnetic member to provide an anti-cogging torque to the rotatable shaft in a second direction that opposes the first direction to at least partially offset the cogging torque. The method also includes selectively varying an amount of the anti-cogging torque provided to the rotatable shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
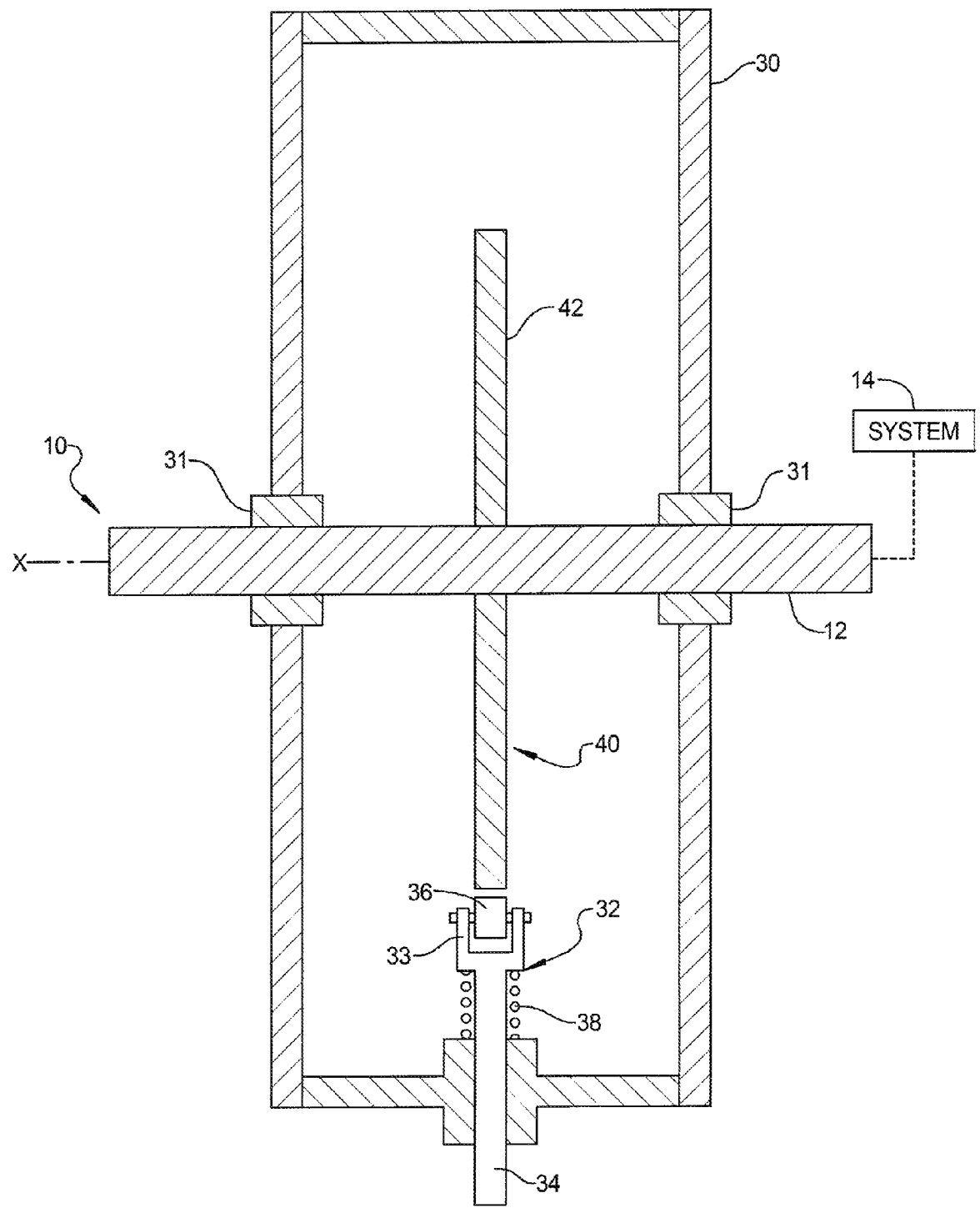
FIG. 1 is a side, sectional view of an apparatus that improves rotation of a rotatable shaft according to various exemplary embodiments of the present disclosure.

Referring initially to FIG. 1, an anti-cogging apparatus 10 is illustrated according to various exemplary embodiments. The apparatus 10 can be operably coupled to a rotatable shaft 12, and the shaft 12 can be part of or otherwise connected to a system 14, such as an electric motor, a crankshaft of an internal combustion engine, a camming system, etc. as will be discussed.

Operation of the system 14 can impart a cyclical load (i.e., a cogging load or cogging torque) on the shaft 12. For instance, if the system 14 is a known electric motor and the shaft 12 is the output shaft of that motor, cogging torque can occur due to magnetic interaction between the magnets of the rotor and the stator poles. This cogging can occur cyclically at known rotational angles of the shaft 12 relative to the rotational axis X. Thus, the cogging can occur N times during every rotation at predetermined angular positions.

However, the anti-cogging apparatus 10 can facilitate rotation of the rotatable shaft 12 despite this cogging torque as will be discussed in greater detail below. The apparatus 10 generates anti-cogging loads that at least partially offset the cogging loads to thereby facilitate rotation of the shaft 12.

Figure 11:
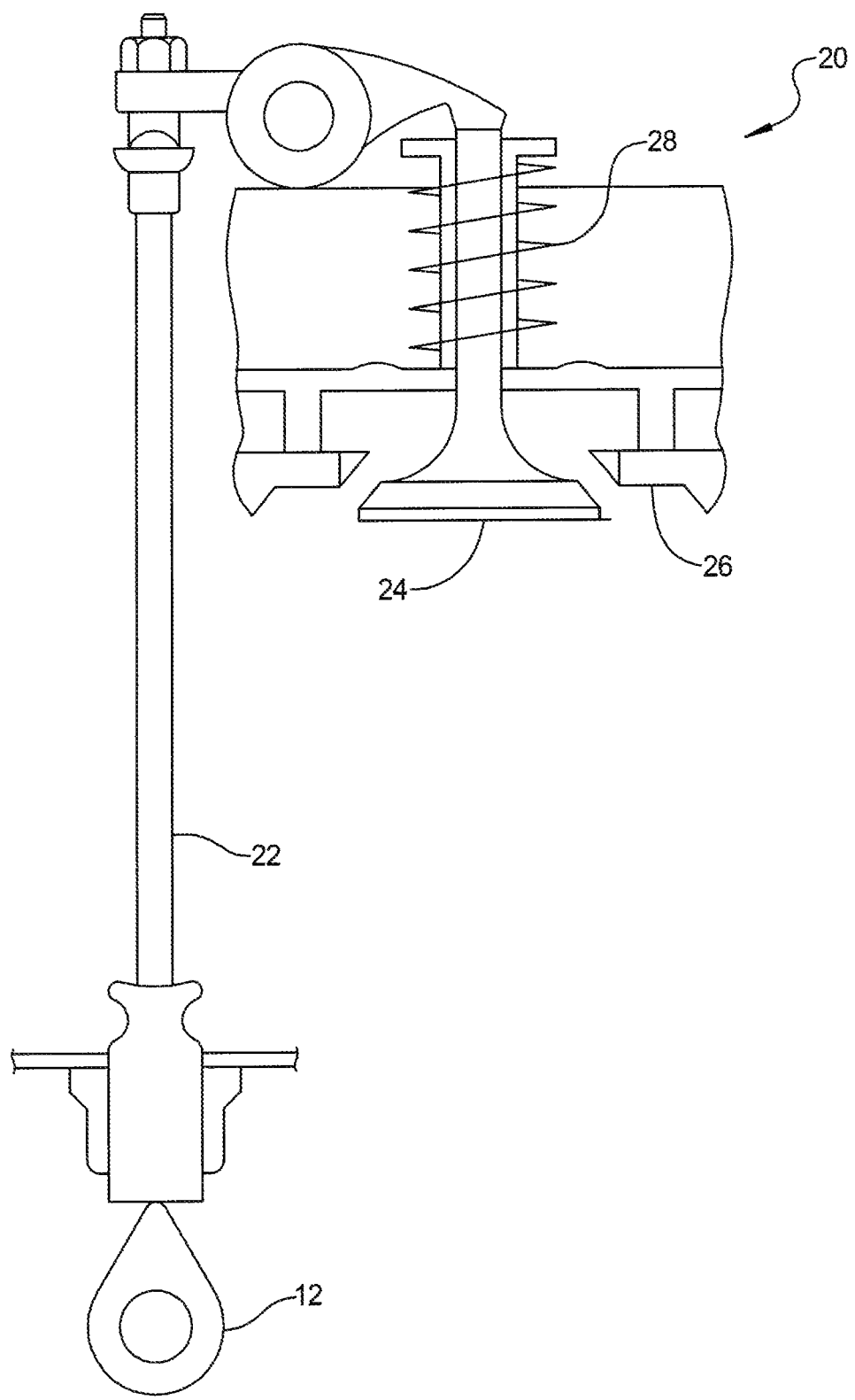
FIG. 11 is a schematic view of a cam system that can be operably coupled to the anti-cogging apparatus of the present disclosure.

It will be appreciated that the term "cogging" is defined broadly herein to mean any torque load that is imparted on the shaft 12 cyclically at known rotational angles of the shaft 12. Thus, the system 14 could be an electric motor as mentioned above. The system 14 could also be an internal combustion engine, and the shaft 12 could be the crankshaft of the engine, wherein the "cogging" is imparted on the crankshaft as a piston moves within a cylinder to vary pressure therein. The system 14 could also be a known cam system 20 (FIG. 11) and the shaft 12 can be an input shaft that cams a pushrod 22 in one direction to thereby push a valve 24 away from its seat 26 against the biasing force of a biasing member 28. Further rotation of the shaft 12 allows the biasing member 28 to bias the valve 24 back toward the seat 26. Thus, the varying biasing loads from the biasing member 28 can impart a "cogging" on the shaft 12. It will be appreciated, though, that the system 14 could be of any other type without departing from the scope of the present disclosure.

Figure 2:
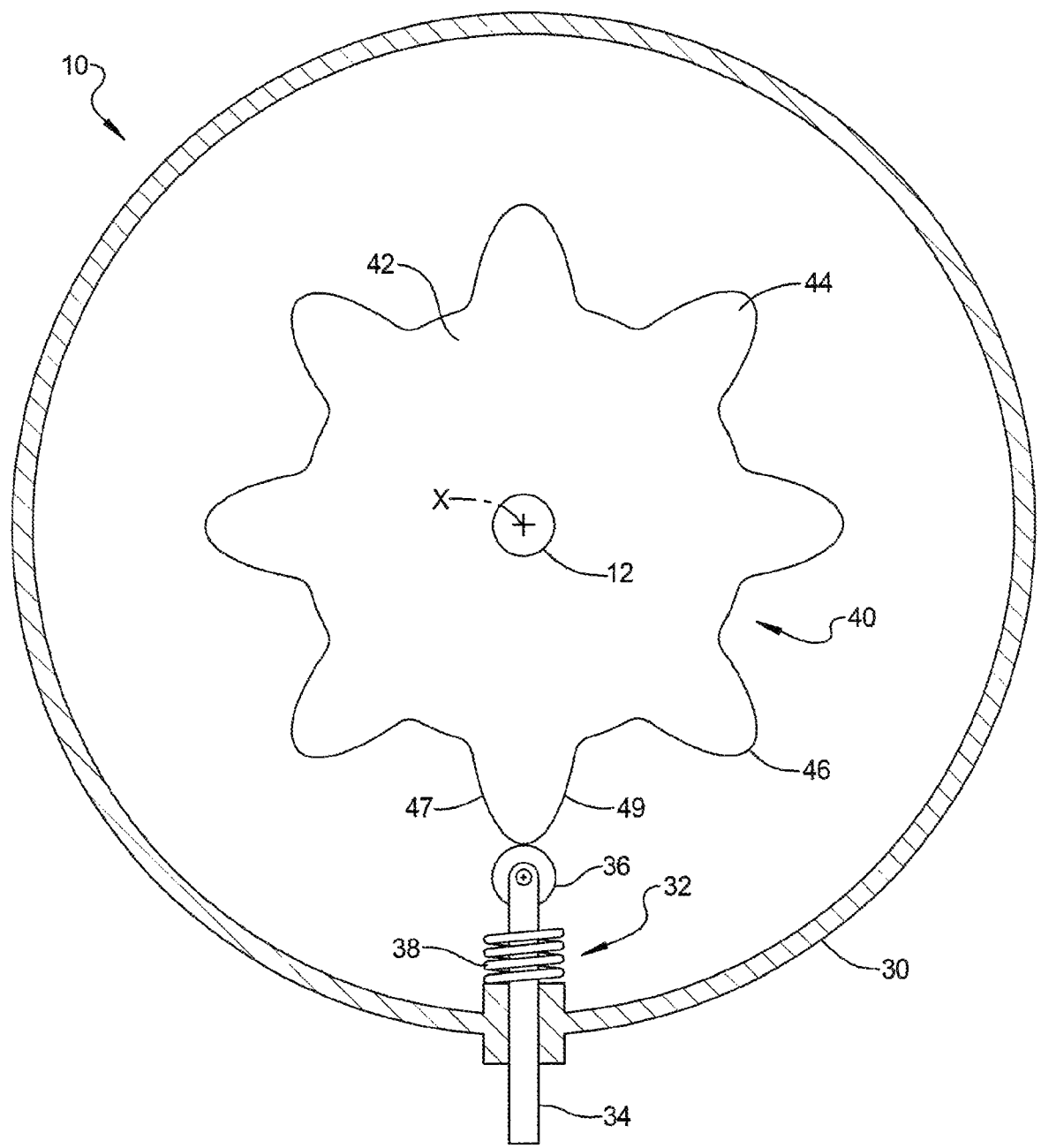
FIG. 2 is a front, sectional view of the apparatus of FIG. 1.
Figure 3:
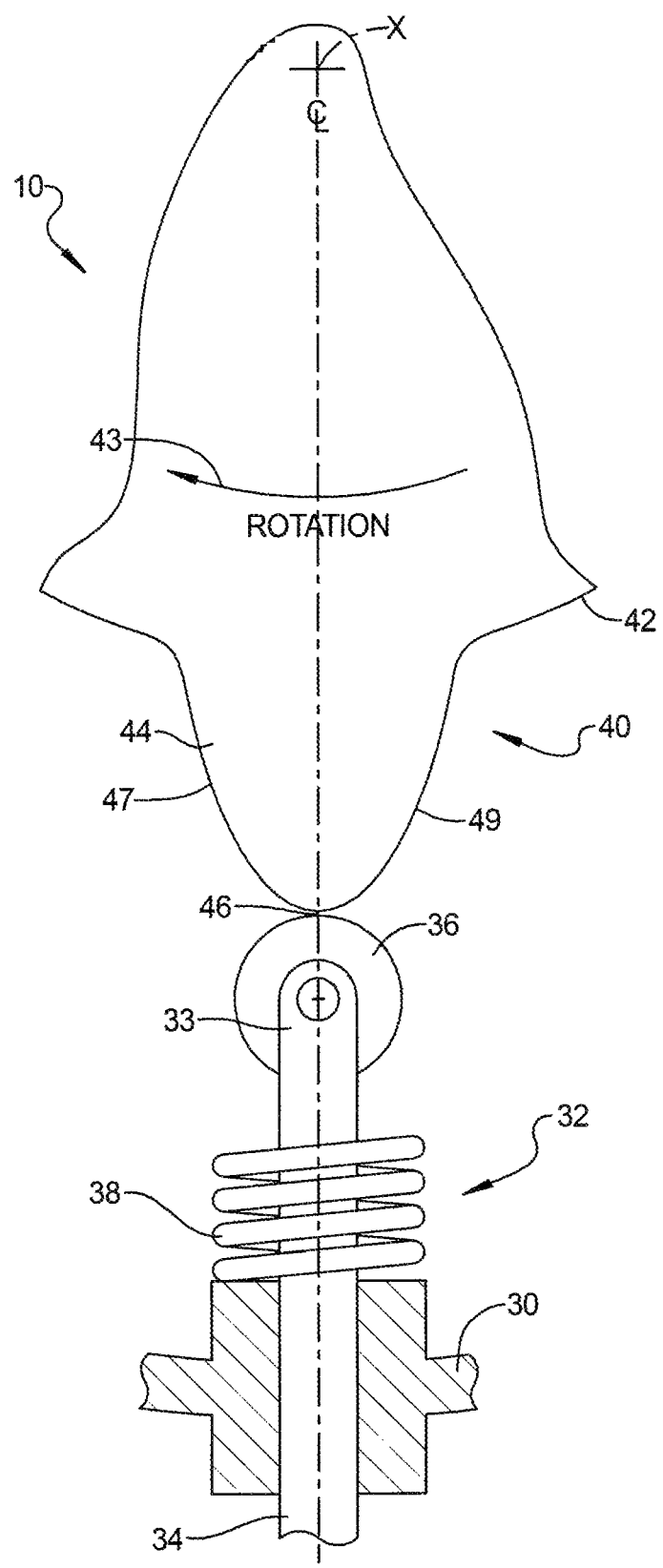
FIG. 3 is a front, detail view of the apparatus of FIG. 1.

Referring now to FIGS. 1-3, the anti-cogging apparatus 10 will be discussed in greater detail. As shown, the apparatus 10 can include a support member 30 or housing. The support member 30 can be of any suitable shape and construction and can be disposed adjacent the shaft 12. Specifically, the shaft 12 can extend through the support member 30 and can be rotatably supported thereon by one or more bearings 31. Thus, the shaft 12 can rotate relative to the support member 30.

The apparatus 10 can also include a first anti-cogging member 32. The first anti-cogging member 32 can include a rod 34 and an abutment member 36. The rod 34 can be slidably attached to the support member 30 and can slide radially toward and away from the rotational axis X of the shaft 12.

Also, in the embodiments illustrated, the abutment member 36 can be a small wheel or roller that is rotatably attached to a forked end 33 of the rod 34; however, the abutment member 36 could be fixed to the rod 34 in some embodiments.

The first anti-cogging member 32 can also include a biasing member 38. The biasing member 38 can be a helical compression spring that is disposed between the forked end 33 of the rod 34 and the support member 30. However, the biasing member 38 could be of another type. The biasing member 38 can bias the abutment member 36 toward the axis of rotation X of the shaft 12.

The apparatus 10 can further include a second anti-cogging member 40. As shown in FIG. 2, the second anti-cogging member 40 can include a cam 42 that is coupled (e.g., fixed) to the shaft 12 for rotation therewith. The cam 42 can include one or more lobes 44 that extend radially away from the axis of rotation X. The lobes 44 can each include a rounded cam surface 46. The cam surface 46 for each lobe 44 can include a leading surface 47 and a trailing surface 49 as shown in FIGS. 2 and 3.

In the embodiments shown, the cam 42 can include a plurality of lobes 44 that are spaced apart at equal rotational angles about the axis X. In FIG. 2, for instance, the cam 42 includes eight lobes 44 that are spaced apart approximately every forty-five degrees (45°) about the axis X. It will be appreciated, however, that the cam 42 can include any number of lobes 44, and the lobes 44 can be spaced apart at any rotational angle. Moreover, the number of lobes 44 and spacing between the lobes 44 can be configured according to the rotational angles at which cogging occurs on the shaft 12 as will be discussed.

The abutment member 36 can rollingly abut against the cam 42 as the cam 42 rotates with the shaft 12. Specifically, the shaft 12 and cam 42 can be driven in rotation by the system 14 about the axis X in the first direction 43 (FIG. 3). As the abutment member 36 rolls along the leading surface 47 of the lobe 44, the leading surface 47 can push the abutment member 36 and the rod 34 radially away from the axis X against the biasing force of the biasing member 38. As the cam 42 further rotates, the abutment member 36 can roll along the trailing surface 49, and the biasing force of the biasing member 38 can, in turn, impart the anti-cogging torque on the shaft 12 in the first direction 43. The abutment member 36 can sequentially abut against the trailing surface 49 of each lobe 44 such that the anti-cogging torque is applied sequentially to the shaft 12 (i.e., at known rotational angles).

Figure 8:
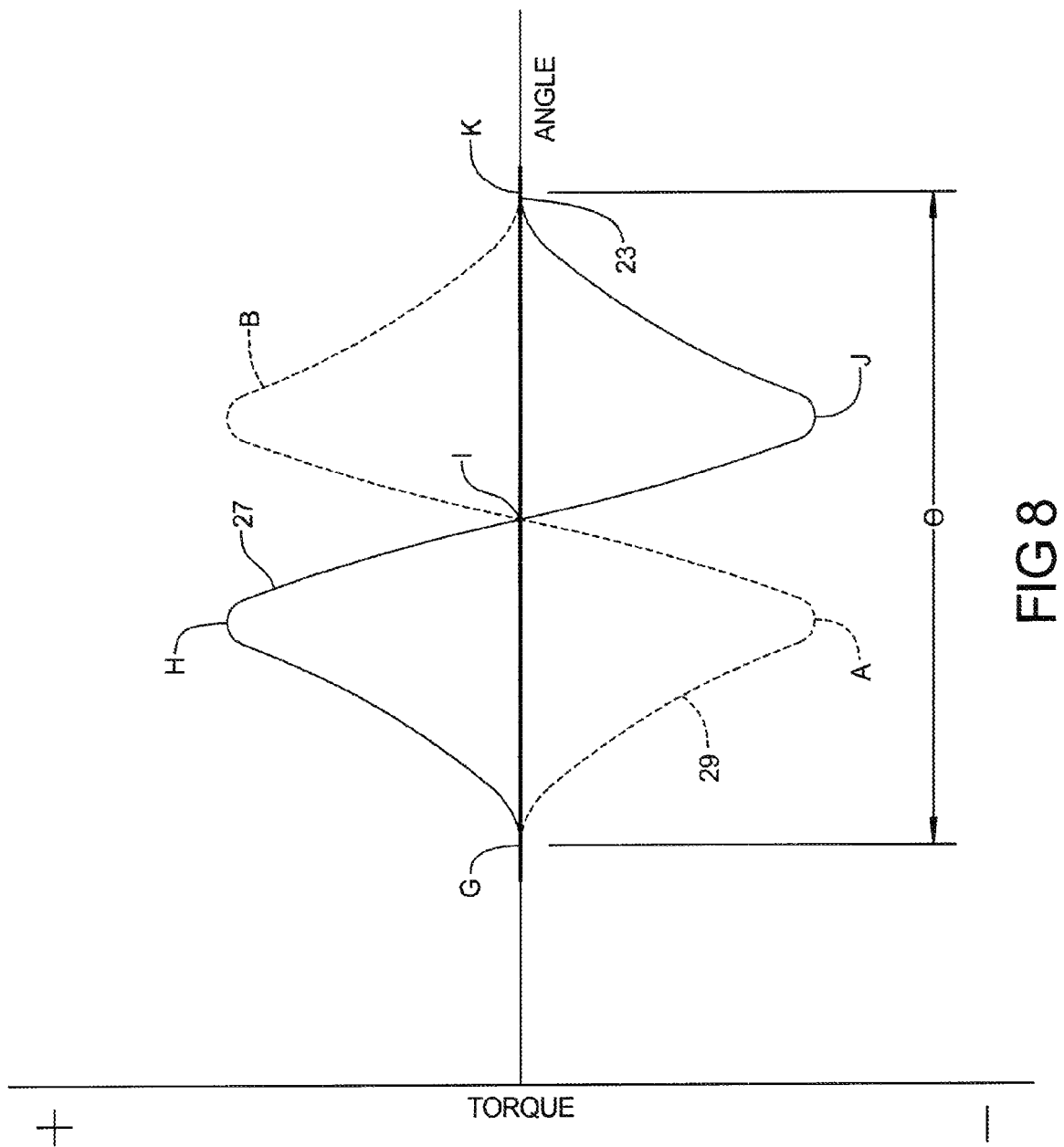
FIG. 8 is a graph representing operation of the apparatus of the present disclosure showing how the apparatus offsets cyclical cogging torque.

As shown in FIG. 8, the anti-cogging torque (represented by broken line 29) and the cogging torque (represented by solid line 27) can be applied substantially simultaneously. Also, the anti-cogging torque can be approximately equal, but opposite, to the cogging torque to substantially offset the cogging torque.

Specifically, FIG. 8 shows at 27 a single cogging torque pulse, which has a substantially sinusoidal profile as is known in the prior art. At point G, the leading edge of the windings could be aligned with the trailing edge of respective ones of the machine's permanent magnets, thereby imparting approximately no torque on the shaft 12. Then, as the shaft 12 further rotates, positive cogging torque (i.e., torque directed along the same direction as rotation of the shaft 12) increases toward a maximum point H, where the windings are spaced approximately half way across an air gap between adjacent permanent magnets. Subsequently, cogging torque can decrease back to approximately zero (point I), where the windings are spaced at the center of the air gap between adjacent magnets. Then, the cogging torque can decrease to a maximum negative value (point J), where the windings are approximately half way out of the air gap. Next, the cogging torque can increase back toward zero (point K), because the windings have advanced enough to align with the adjacent magnets. It will be appreciated that this cogging torque can repeatedly and cyclically follow the profile graphically represented at 27 in FIG. 8.

However, FIG. 8 also shows the anti-cogging torque that the apparatus 10 provides to offset the cogging torque. Specifically, as the abutment member 36 rolls along the leading surface 47, a negative torque (torque opposing the direction of rotation of the shaft 12) is imparted on the shaft 12, as represented in region A of FIG. 8. Anti-cogging torque increases and then decreases back toward zero (point I) at which point the abutment member 36 is located at the land between the leading surface 47 and the trailing surface 49. Then, as the abutment member 36 rolls along the trailing surface 49, a positive torque is imparted on the shaft 12 as represented in region B of FIG. 8. Anti-cogging torque increases and then decreases back toward zero (point K).

As shown in FIG. 8, the anti-cogging torque pulse (regions A and B) is approximately equal but opposite to the cogging torque pulse 27 for a net of zero (represented by line 23 in FIG. 8). In other words, the angular position ($\theta$) at which cogging and anti-cogging occurs and the amounts of the cogging and anti-cogging torques are such that the cogging and anti-cogging torques can substantially offset each other. As such, the apparatus 10 can significantly improve efficiency of the system 14.

Figure 14:
FIG. 14 is a graph representing efficiency gains that can be recognized using the anti-cogging apparatus of the present disclosure.

FIG. 14 illustrates exemplary improvements in efficiency in the system 14 when the apparatus 10 is used. As shown, the gains are most noticeable at lower RPMs, and the gains decrease as the rotational speed increases.

It will be appreciated that the apparatus 10 can be configured differently than those embodiments illustrated in FIGS. 1-3. For instance, the rod 34, abutment member 36, and biasing member 38 of the first anti-cogging member 32 could be fixed for rotation with the shaft 12 while the cam surface 46 could be fixed on the support member 30.

Also, there can be any number of first and second anti-cogging members 32, 40. For instance, if there are N number of cogging torque pulses per revolution of the shaft 12, there can be a single first anti-cogging member 32 and N number of lobes 44 on the second anti-cogging member 40 such that there are N anti-cogging torque pulses per revolution of the shaft 12. Alternatively, there can be N number of first anti-cogging members 32 and a single lobe 44 on the second anti-cogging member 40. Furthermore, there can be an amount A of first anti-cogging members 32 and an amount B of second anti-cogging members 40 such that the product of A and B is equal to N ($A \times B = N$).

Still further, in some embodiments, the first and/or second anti-cogging members 32, 40 can be operably connected to the shaft 12 in any way other than that shown in FIGS. 1-3. For instance, where the system 14 is an electric motor, the second anti-cogging member 40 could be connected via a gearset (not shown) to the rotor of the electric motor, whereby the combination of gear ratio, the number of lobes 44, and the number of first anti-cogging members 32 produces the N number of anti-cogging torque pulses per revolution of the shaft 12.

Additionally, it will be appreciated that the amount of anti-cogging torque can be affected by the profile (e.g., slope) of the cam surface 46, the spring constant of the biasing member 38, etc. Thus, these features can be configured to produce the desired anti-cogging torque.

Figure 4:
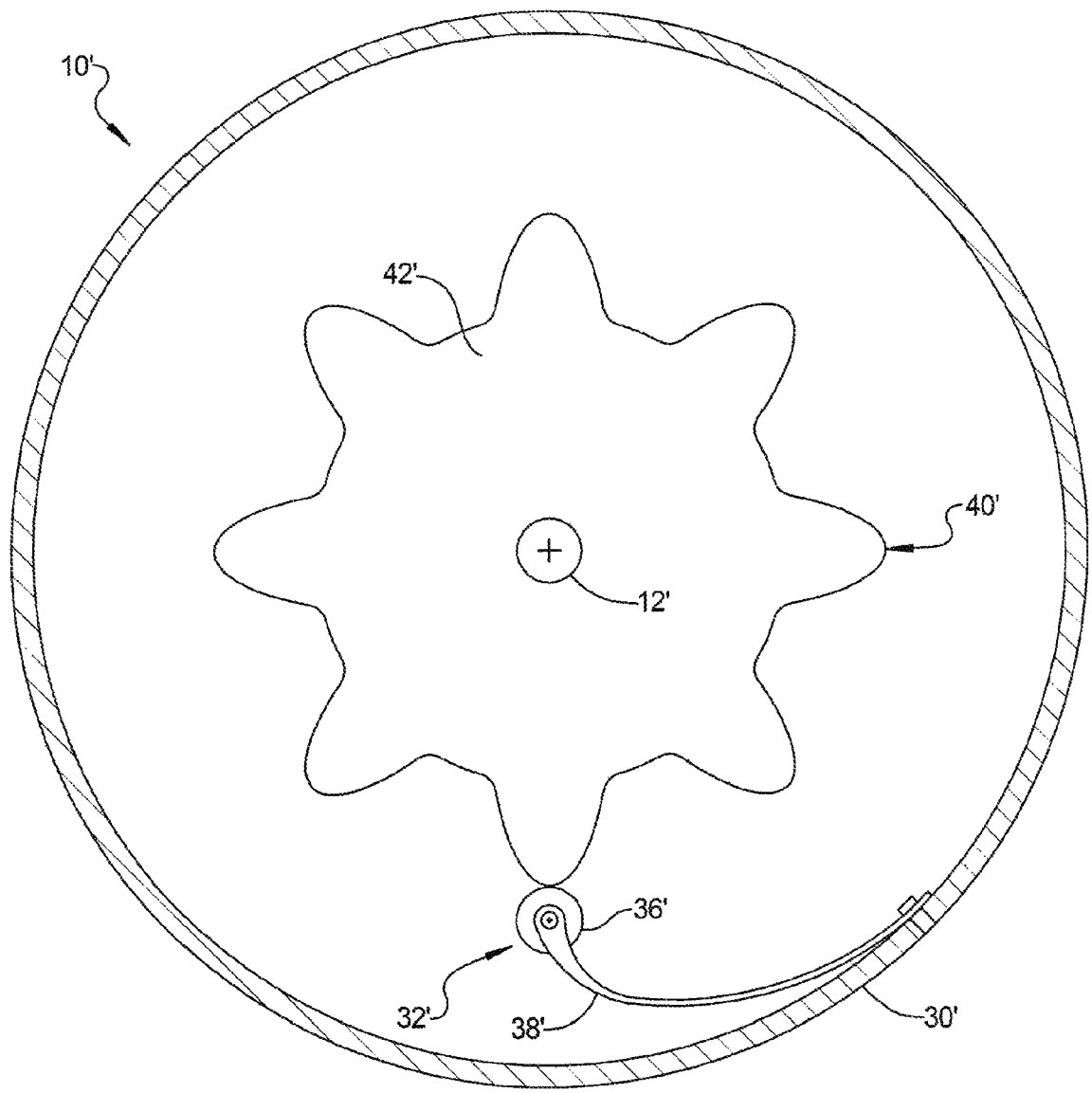
FIG. 4 is a front, sectional view of the apparatus of the present disclosure according to additional embodiments.

Moreover, the biasing member 38 could be of any type other than the helical spring illustrated in FIGS. 1-3. For instance, as shown in FIG. 4, the biasing member 38' of the first anti-cogging member 32' can include a leaf spring. Thus, the biasing member 38' can resiliently flex as the cam 42' rotates with the shaft 12' to supply the anti-cogging torque as discussed above.

Figure 5:
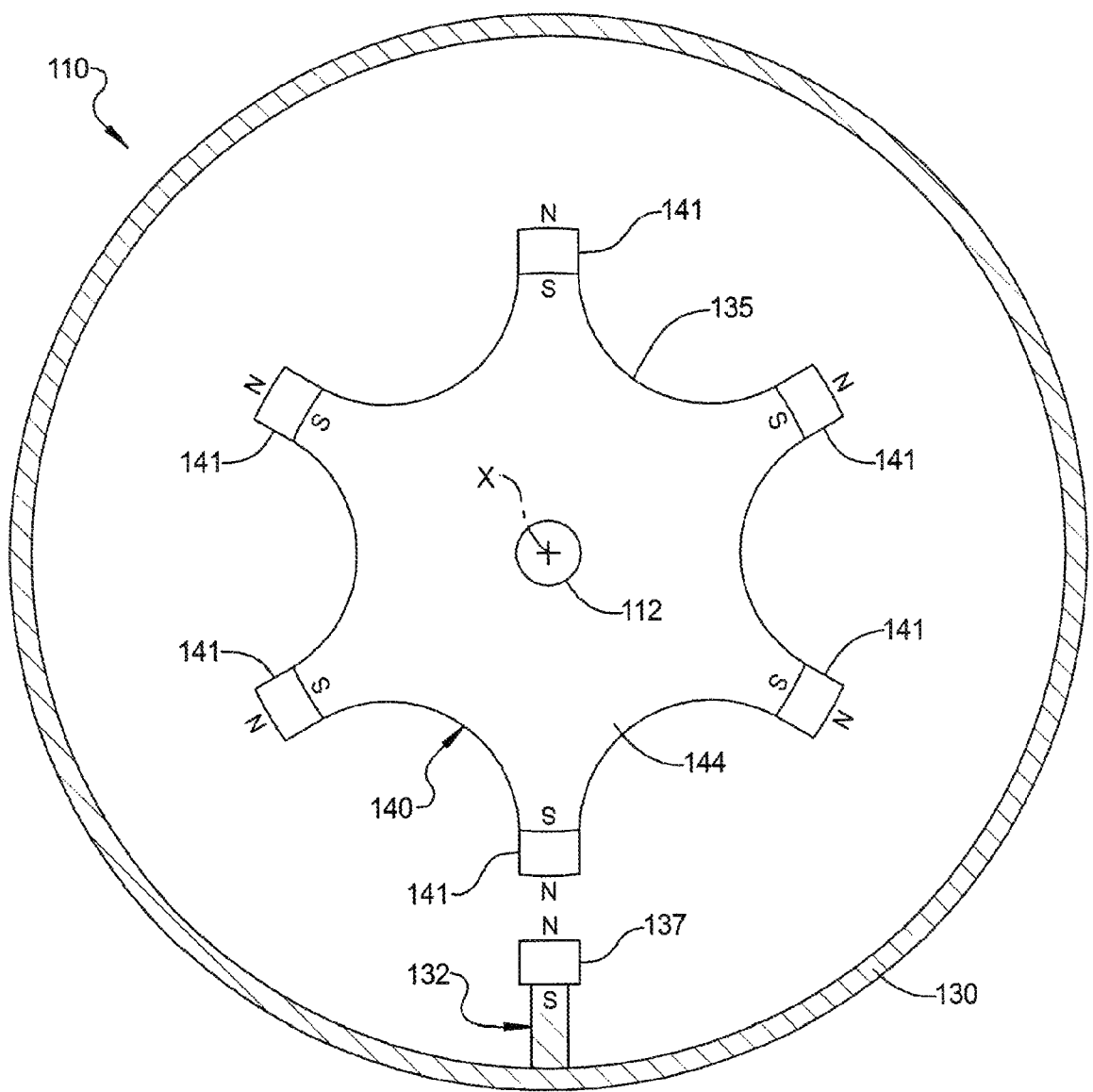
FIG. 5 is a front, sectional view of the apparatus of the present disclosure according to additional embodiments.
Figure 6:
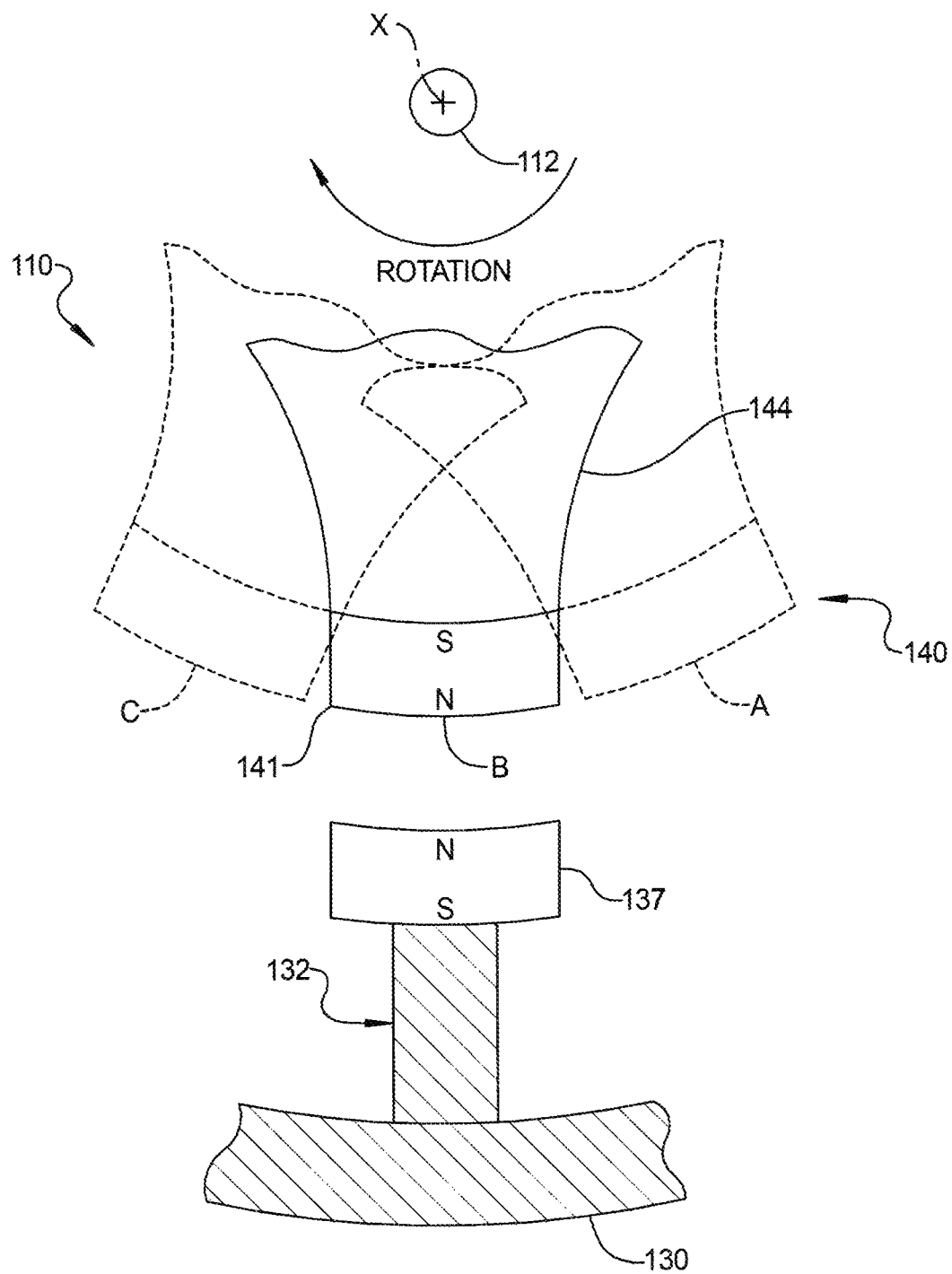
FIG. 6 is a front, detail view of the apparatus of FIG. 5.

Referring now to FIGS. 5 and 6, additional embodiments of the anti-cogging apparatus 110 will be discussed in detail. Components that correspond to those in the embodiments of FIGS. 1-3 are indicated with corresponding reference numerals increased by 100.

As shown, the anti-cogging apparatus 110 includes a first support member 130 and a second support member 135. The apparatus 110 includes at least one first anti-cogging member 132 and one or more second anti-cogging member 140. In the embodiments shown, the first anti-cogging member 132 can include a first magnetic member 137 (e.g., a permanent magnet), and the second anti-cogging members 140 can each include a second magnetic member 141. It will be appreciated that there can be any number of first and second magnetic members 137, 141.

The first magnetic member 137 can be fixed to the first support member 130 and can extend radially inward toward the rotational axis X. The second support member 135 can include a plurality of lobes 144 that extend radially away from the axis X, and the second magnetic members 140 can be fixed to the respective radial ends of the lobes 144. Thus, as the shaft 112 rotates about the axis X, the first magnetic member 137 can sequentially align in an imaginary straight radial line with the second magnetic members 141.

Also, the second magnetic members 141 can each be arranged with one magnetic pole (e.g., the north pole) facing radially outward. The first magnetic member 137 can be arranged with the same magnetic pole (e.g., the north pole) facing radially inward. Thus, as shown in FIG. 6, as one of the second magnetic members 141 moves immediately adjacent the first magnetic member 137, the magnetic members 137, 141 can magnetically repel each other.

FIG. 6 illustrates interaction between a single pair of first and second magnetic members 137, 141. When rotating from position A to position B, the magnetic members 137, 141 magnetically repel each other, resulting in a negative torque being applied to the shaft 112, which increases as the magnetic members 137, 141 approach each other and then begins to reduce as the moment arm acting on the shaft 112 decreases. (This is represented by region A in FIG. 8.) When the magnetic members 137, 141 are in position B shown in FIG. 6, the repulsive force therebetween is at a maximum. However, since the members 137, 141 are aligned radially, the moment arm (and the torque) is substantially zero. Then, as the magnetic members 137, 141 move to position C of FIG. 6, the repulsive force therebetween causes a positive torque on the shaft 112 as represented in region B of FIG. 8.

It will be appreciated that the amount of anti-cogging torque can be dependent upon the field strength of the magnetic members 137, 141, the radial distance between the magnetic members 137, 141, the size and shape of the magnetic members 137, 141, the radial distance of the magnetic members 137, 141 from the axis X, etc. Thus, each of these variables can be configured to produce the desired anti-cogging torque.

As discussed above, the number and relative position of the first and second magnetic members 137, 141 can be configured such that the anti-cogging torque is applied approximately concurrently with the cogging torque such that the two torques at least partially offset. Thus, the overall system efficiency can be improved, vibration of the shaft 112 can be reduced, etc.

Those having ordinary skill in the art will appreciate that the arrangement of the magnetic members 137, 141 could be varied such that the magnetic members 137, 141 magnetically attract each other. Whether the magnetic members 137, 141 attract or repel each other could depend on whichever arrangement most effectively offsets cogging.

Figure 7:
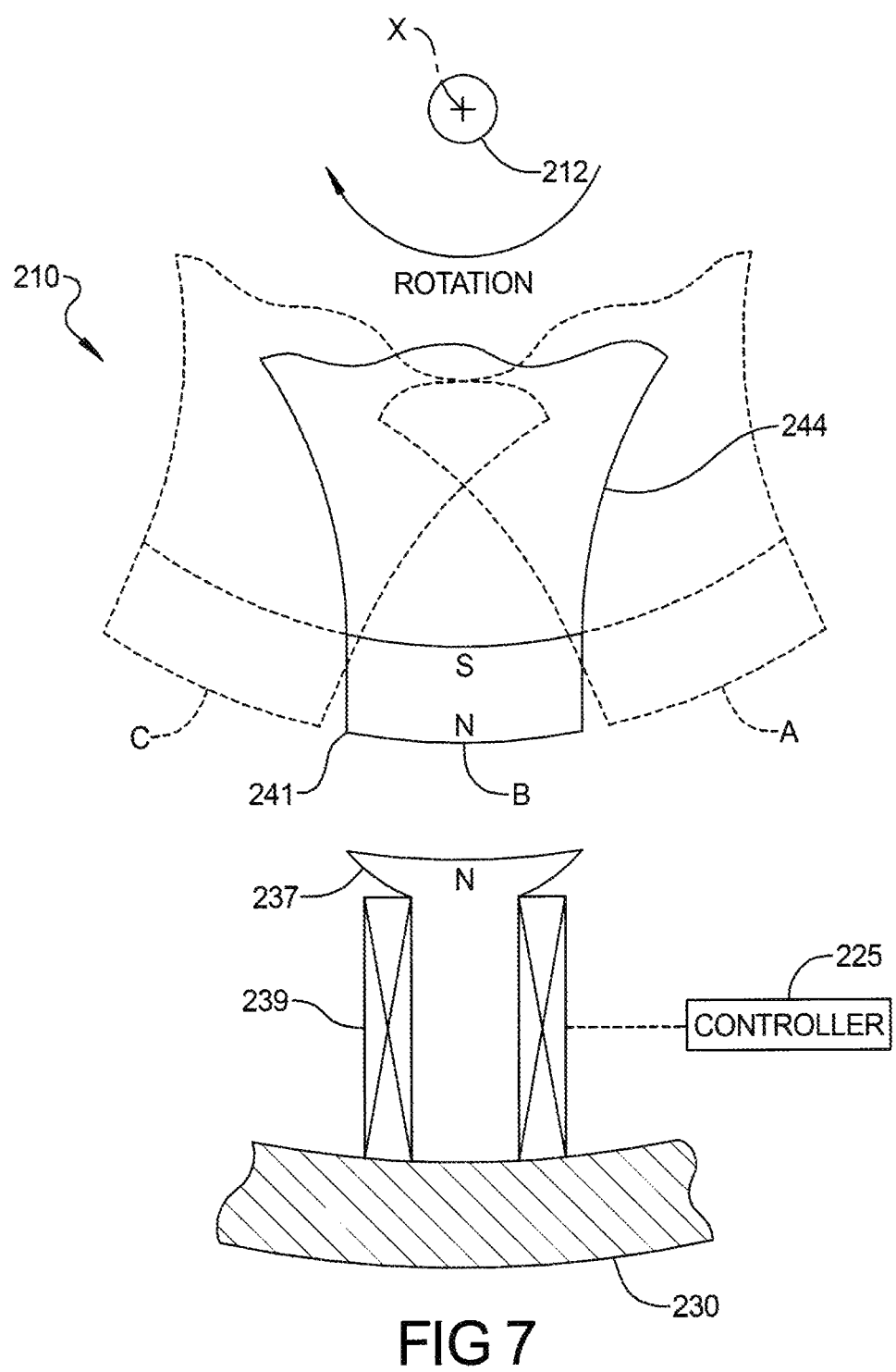
FIG. 7 is a front, detail view of the apparatus of the present disclosure according to additional embodiments.

Referring now to FIG. 7, the anti-cogging apparatus 210 will be discussed according to additional embodiments. Components that correspond to those in the embodiments of FIGS. 1-3 are indicated by corresponding reference numerals increased by 200.

As shown, the anti-cogging apparatus 210 can include first and second magnetic members 237, 241. However, the first magnetic member 237 can include a ferromagnetic material with windings 239 thereon. Thus, the first magnetic member 237 can operate as an electromagnetic (i.e., with a magnetic flux that varies according to the current within the windings 239).

In the embodiments illustrated, the second magnetic member 241 includes permanent magnets. However, it will be appreciated that the second magnetic member 241 could include windings 239 to operate as an electromagnet while the first magnetic member 237 includes a permanent magnet. In still other embodiments, both the first and second magnetic members 237, 241 can include windings 239 to operate as electromagnets.

The windings 239 can be operably connected to a controller 225, which is schematically illustrated in FIG. 7. The controller 225 can include a variable current source, programmed logic, etc., and the controller 225 can variably control the current flowing through the windings 239 to thereby vary the magnetic flux of the first magnetic member 237 during operation. As such, the controller 225 can vary the magnetic flux to thereby vary the anti-cogging torque imparted to the shaft 212.

The embodiments of FIG. 7 could be used where the apparatus 210 is operably coupled to an electric motor. In some cases, the magnetic flux in the pole cores of the motor might be varied to control the rotational speed of the shaft 212, which would change the cogging torque applied to the shaft 212. As a result, the controller 225 could control the amount of current flowing through the windings 239 to thereby vary the magnetic flux of the first magnetic member 237 to offset the varying cogging torque. Thus, the anti-cogging torque can be varied according to the amount of cogging torque applied to the shaft 212, according to the relative angular position of the first and second magnetic members 237, 241, etc.

In some embodiments, the controller 225 could be in communication with a known torque sensor (not shown) that automatically detects the amount of cogging torque applied to the shaft 212. As a result, the controller 225 could automatically adjust the magnetic flux of the first magnetic member 237 to supply an equal, but opposite, anti-cogging torque to the shaft 212.

Figure 9:
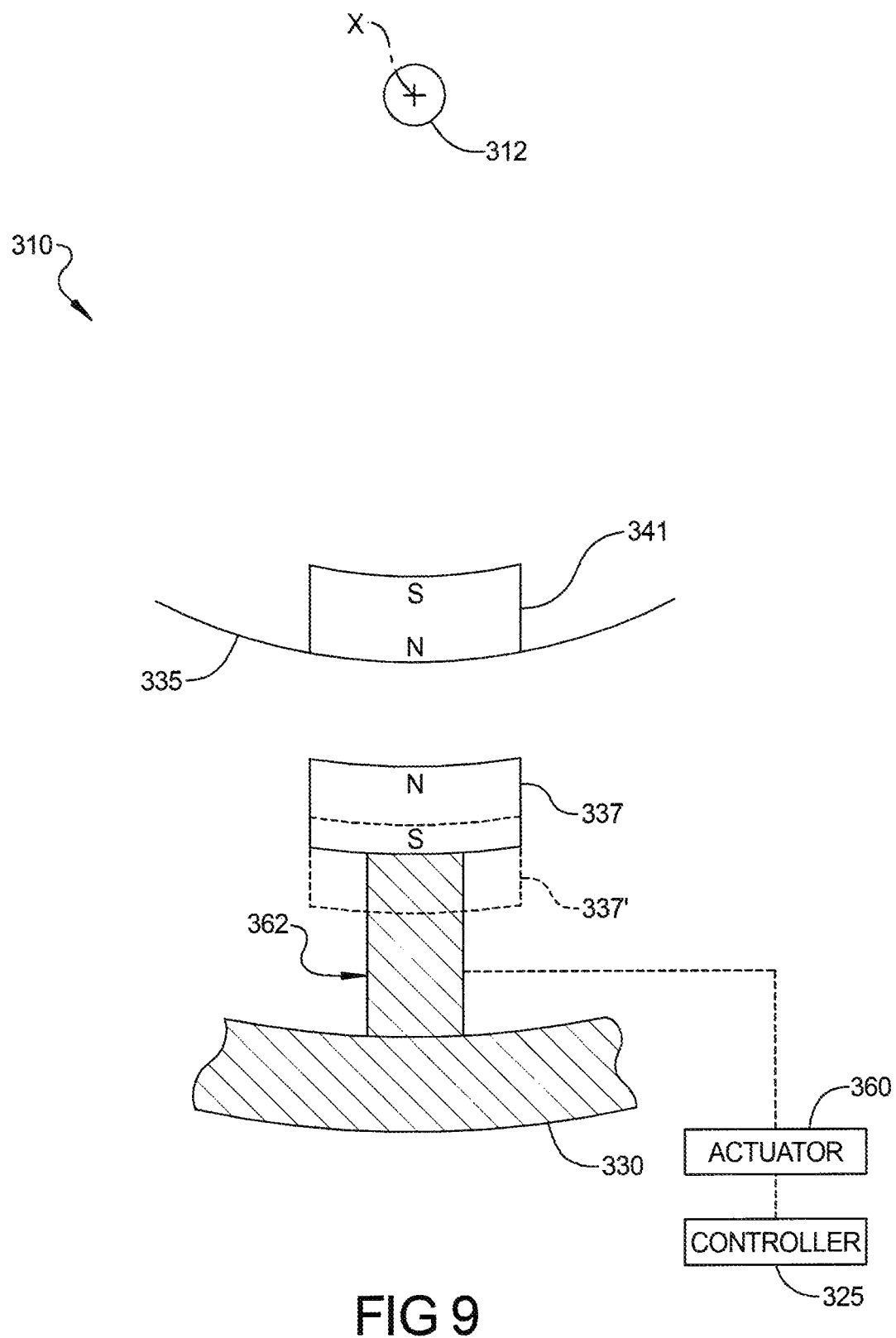
FIG. 9 is a front, detail view of the apparatus of the present disclosure according to additional embodiments.

Referring now to FIG. 9, additional embodiments of the anti-cogging apparatus 310 will be discussed. Components that correspond to components of the embodiments of FIGS. 1-3 are indicated with corresponding reference numbers increased by 300.

As shown, the first magnetic member 337 can be a permanent magnet that is fixed to a rod 362. The rod 362 can be moveably (e.g., slidably) coupled to the first support member 330 so as to be moveable toward and away from the axis X. In the embodiments illustrated, the rod 362 and first magnetic member 337 can move along a straight radial line relative to the axis X. (A first radial position is indicated at 337 and a second radial position is indicated at 337'.)

The rod 362 can also be operably coupled to an actuator 360, which actuates the rod 362 and magnetic member 337 radially. The actuator 360 can be of any suitable type, such as an electric actuator. In some embodiments, the rod 362 can be threaded to the support member 330, and the actuator 360 can threadably advance the rod 362 radially such that the rod 362 remains in place relative to the support member 330 even when the actuator 360 is switched OFF. The actuator 360 can be in communication with a controller 325 for controlling radial movement of the first magnetic member 337.

Accordingly, the distance (i.e., the air gap) between the first magnetic member 337 and the second magnetic member 341 can be controlled by radially moving the first magnetic member 337. As the air gap is reduced, the anti-cogging torque is increased and vice versa. Thus, the anti-cogging torque imparted to the shaft 312 can be varied, for instance, according to the amount of cogging torque being applied to the shaft 312.

It will be appreciated that the second magnetic member 341 could be moveable radially relative to the axis X instead of or in addition to the first magnetic member 337. It will also be appreciated that both magnetic members 337, 341 could be moveable by the actuator 360.

Figure 10A:
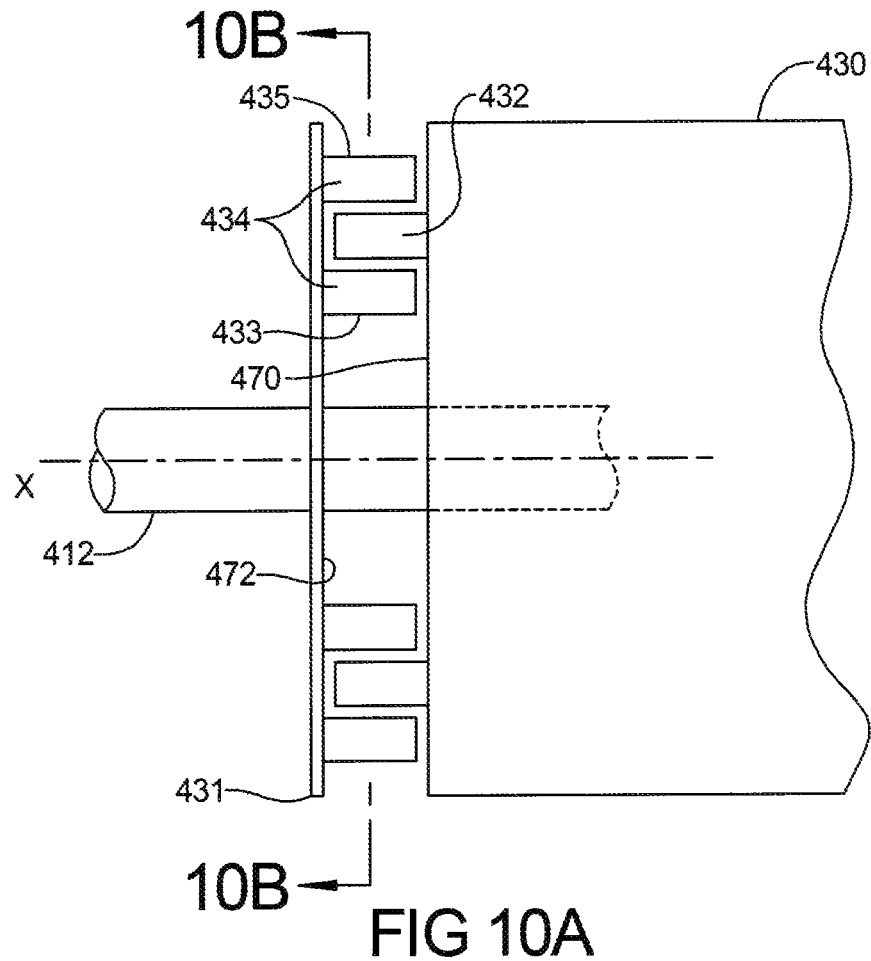
FIG. 10A is a side view of the apparatus of the present disclosure according to additional embodiments.
Figure 10B:
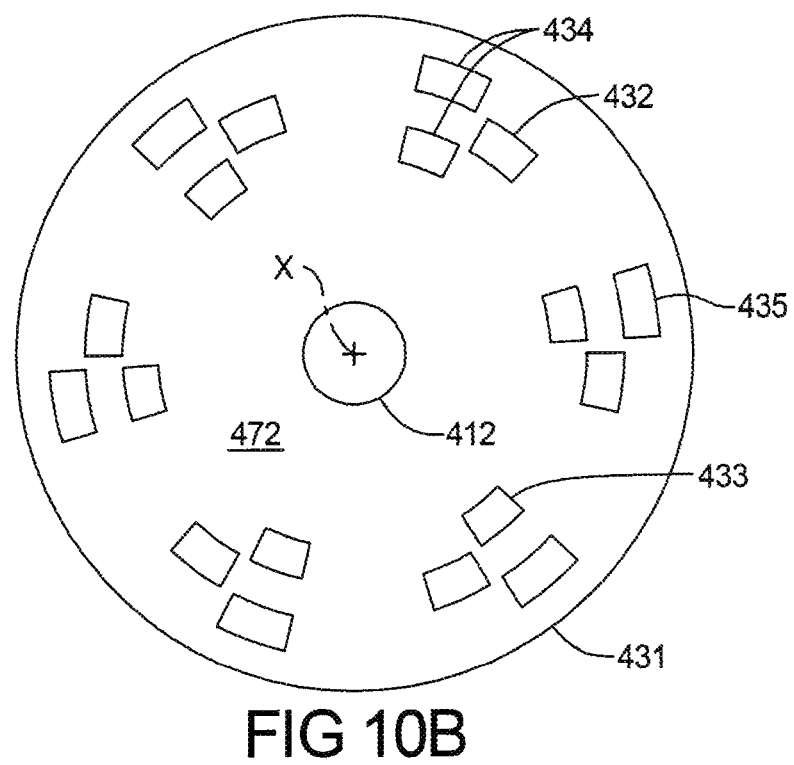
FIG. 10B is a section view of the apparatus taken along the line 10B-10B of FIG. 10A.

Referring now to FIGS. 10A and 10B, additional embodiments of the anti-cogging apparatus 410 will be discussed. Components that correspond to those of the embodiments of FIGS. 1-3 are indicated with corresponding reference numbers increased by 400.

As shown, the apparatus 410 can include a first support member 430 that is tubular and that includes an end face 470. The apparatus 410 can also include a second support member 431 that is flat and disc-shaped so as to include a surface 472 that faces the end face 470 of the first support member 430. The second support member 431 can be coupled (e.g., fixed) to the shaft 412 for rotation therewith relative to the first support member 430.

The apparatus 410 can also include a plurality of first magnetic members 432 that are fixed to the end face 470 of the first support member 430. There can be any number of first magnetic members 432, and the first magnetic members 432 can be each disposed at the same radial distance (i.e., a third radial distance) away from the axis X and can be equally spaced away from each other at equal angular distances. For instance, there can be six first magnetic members 432 at every sixty degrees)(60° about the axis X.

Furthermore, the apparatus 410 can include a plurality of second magnetic members 434. The second magnetic members 434 can be arranged in pairs that are aligned along a straight, radial line. Each pair can include an inner magnetic member 433 and an outer magnetic member 435. The inner magnetic members 433 can be annularly arranged about the axis X at a radial distance (i.e., a first radial distance). The outer magnetic members 435 can be annularly arranged about the axis X at a radial distance that is greater than that of the inner magnetic members 433 (i.e., a second radial distance). The radial distance of first magnetic members 432 can be greater than that of the inner magnetic members 433 and less than that of the outer magnetic members 435. Stated differently, the inner magnetic members 433, the first magnetic members 432, and the outer magnetic members 435 can be arranged in concentric circles about the axis with the ring of first magnetic members 432 disposed between the inner and outer magnetic members 433, 435.

As the shaft 412 rotates, the inner and outer magnetic members 433, 435 can rotate relative to the first magnetic members 432. As the first magnetic members 432 move between respective pairs of the inner and outer magnetic members 433, 435, the first magnetic members 432 can magnetically interact (e.g., repel) the inner and outer magnetic members 433, 435 to cause the anti-cogging torque to be imparted to the shaft 412. It will be appreciated that because the first magnetic members 432 move between the inner and outer magnetic members 433, 435, the force of magnetic repulsion can be increased. As a result, anti-cogging torque can be increased (e.g., approximately doubled).

The embodiments of FIGS. 10A and 10B could be varied. For instance, there could be multiple concentric rings of first magnetic members 432, and each ring could be radially arranged to move between respective pairs of rings of inner and outer magnetic members 433, 435. Accordingly, anti-cogging torque can be further increased.

As mentioned above, the anti-cogging apparatus 10, 110, 210, 310, 410 can be operably coupled to an output shaft of an electric motor to offset the cogging that occurs during operation. The apparatus 10, 110, 210, 310, 410 could also be operably coupled to an input shaft of a cam system (FIG. 11) to offset cogging in largely the same fashion. Moreover, the apparatus 10, 110, 210, 310, 410 could be operably coupled to a crankshaft of an internal combustion engine. This can be advantageous, for instance, when combustion is not occurring (e.g., at engine startup, in an engine with certain cylinders that are deactivated, etc.).

Figure 12:
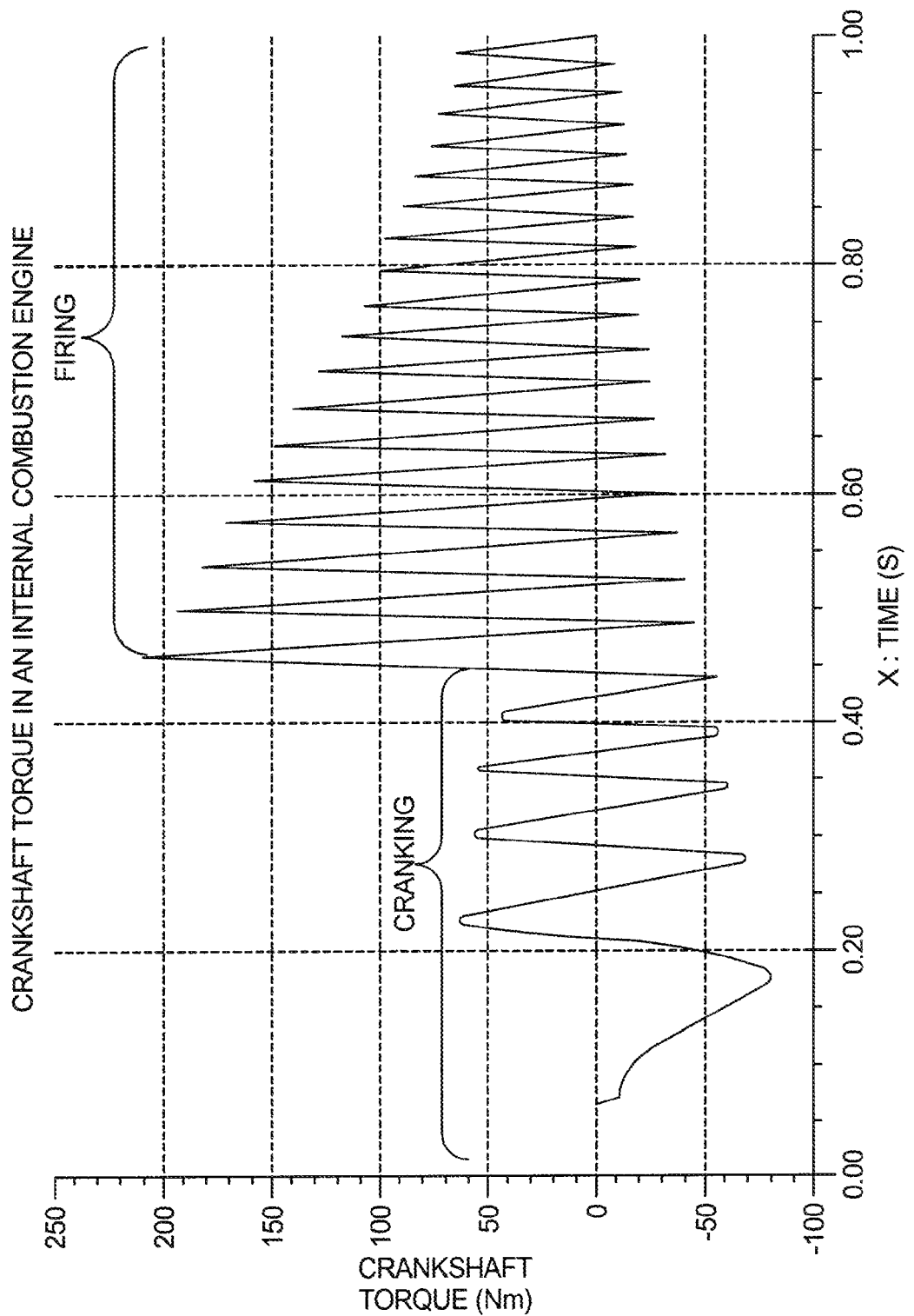
FIG. 12 is a graph representing torque in a crank shaft of an internal combustion engine.
Figure 13:
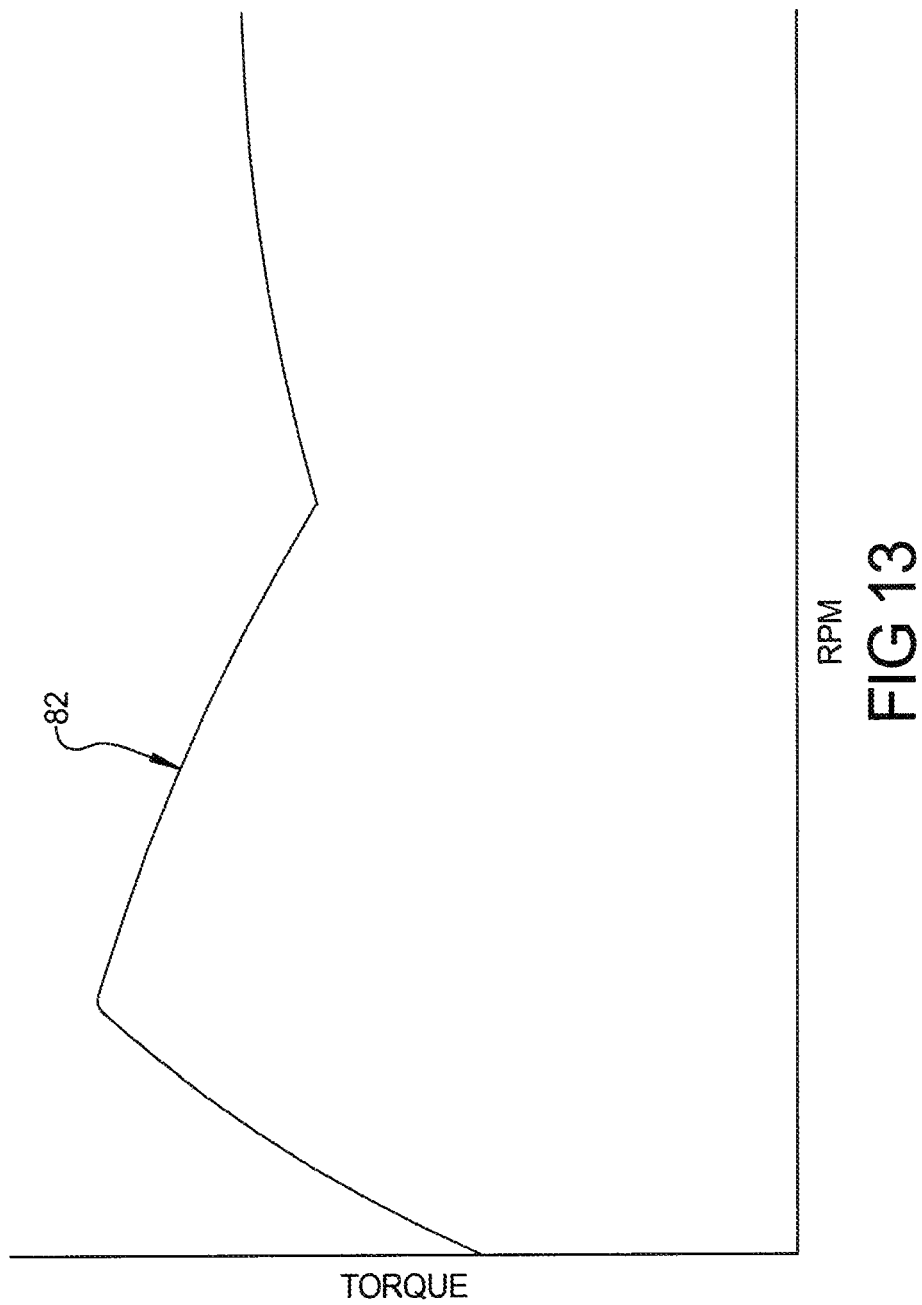
FIG. 13 is a graph representing the maximum cranking torque as a function of engine speed.

FIG. 12 graphically represents the torque on a crankshaft of a known internal combustion engine over time. Also, FIG. 13 includes line 82 that represents the variation of the maximum cranking torque as a function of the engine speed (RPM). As shown in FIG. 12, the torque is cyclical and changes from an initial cranking torque sequence (before combustion occurs in the cylinders) to a firing torque sequence (during combustion) as indicated in FIG. 12. In each of these sequences, there are periods in which the torque is negative. The apparatus 10, 110, 210, 310, 410 could be operably connected to the crankshaft to substantially reduce (e.g., eliminate) these periods of negative torque affecting the crankshaft. As such, the crankshaft would experience less torque resisting rotation, the engine could be operated more efficiently, a smaller starter motor could be used, idle speed can be reduced to reduce fuel usage, etc.

In summary, the anti-cogging apparatus 10, 110, 210, 310, 410 of the present disclosure can offset cogging torques that are imparted on a rotating shaft 12, 112, 212, 312, 412. As such, the apparatus 10, 110, 210, 310, 410 can improve efficiency, can reduce vibration, and otherwise improve rotation of the shaft 12, 112, 212, 312, 412. Also, the apparatus 10, 110, 210, 310, 410 could be incorporated into an existing electric motor, cam system, IC engine, or other existing design to thereby improve efficiency, etc. The apparatus 10, 110, 210, 310, 410 can also be very compact, even when incorporated into existing machines.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus that improves rotation of a rotatable shaft about an axis, the rotatable shaft having a cyclical cogging torque acting thereon in a first direction, the apparatus comprising:
   a first support member that is coupled to the rotatable shaft for rotation therewith;
   a second support member that is adjacent the first support member, the first support member operable to rotate relative to the second support member;
   a plurality of first magnetic members coupled to one of the first and second support members, the plurality of first magnetic members including at least one inner magnetic member disposed at a first radial distance from the axis and at least one outer magnetic member disposed at a second radial distance from the axis; and
   a second magnetic member coupled to the other of the first and second support members, the second magnetic member disposed at a third radial distance from the axis, the third radial distance being greater than the first radial distance and less than the second radial distance, the second magnetic member operable to magnetically interact with the at least one inner magnetic member and the at least one outer magnetic member to provide an anti-cogging torque to the rotatable shaft in a second direction that opposes the first direction to at least partially offset the cogging torque.

2. The apparatus of claim 1, wherein the at least one inner magnetic member and the at least one outer magnetic member are aligned on a straight line that extends from the axis.

3. The apparatus of claim 2, wherein the second magnetic member is operable to move between the at least one inner magnetic member and the at least one outer magnetic member to be aligned on the straight line that extends from the axis.

4. The apparatus of claim 1, wherein the at least one inner magnetic member, the at least one outer magnetic member, and the second magnetic member are each permanent magnets.

5. The apparatus of claim 1, wherein the at least one inner magnetic member and the at least one outer magnetic member magnetically repel the second magnetic member to provide the anti-cogging torque to the rotatable shaft.

6. The apparatus of claim 1, wherein the rotatable shaft is at least one of a crankshaft of an internal combustion engine wherein the cogging torque occurs due to varying pressure within an engine cylinder, and an input shaft of a camming system wherein the cogging torque occurs due to varying biasing loads from a biasing member.

7. An apparatus that improves rotation of a rotatable shaft about an axis, the rotatable shaft having a cyclical cogging torque acting thereon in a first direction, the apparatus comprising:
a first support member;
a second support member that is adjacent the first support member and coupled to and rotates with the rotatable shaft, wherein the second support member is operable to rotate relative to the first support member;
a first magnetic member coupled to one of the first and second support members; and
a second magnetic member coupled to the other of the first and second support members, the second magnetic member operable to magnetically interact with the first magnetic member to provide an anti-cogging torque to the rotatable shaft in a second direction that opposes the first direction to at least partially offset the cyclical cogging torque,
wherein the rotatable shaft is a crankshaft of an internal combustion engine, and
wherein the cyclical coming torque acting on the rotatable shaft is based on varying pressure within a cylinder of the internal combustion engine.

8. The apparatus of claim 7, further comprising:
an actuator operable to actuate one of the first and second magnetic members relative to the other one of the first and second magnetic members to vary a distance between the first and second magnetic members; and
a controller that controls and varies an amount of the anti-cogging torque provided to the rotatable shaft and is operable to control the actuator to control the distance between the first and second magnetic members to thereby vary the amount of the anti-cogging torque provided to the rotatable shaft.

9. The apparatus of claim 8, wherein:
the first and second magnetic members are operable to be aligned along a straight line extending radially from the axis; and
the actuator is operable to actuate the one of the first and second magnetic members relative to the other one of the first and second magnetic members along the straight line.

10. The apparatus of claim 7, further comprising a controller that controls and varies an amount of the anti-cogging torque provided to the rotatable shaft, wherein:
at least one of the first and second magnetic members includes an electromagnet; and
the controller is operable to control the electromagnet to vary a magnetic flux of the electromagnet to thereby vary the amount of the anti-cogging torque provided to the rotatable shaft.

11. The apparatus of claim 7, further comprising a controller that controls and varies an amount of the anti-cogging torque provided to the rotatable shaft, wherein:
the controller receives a torque signal from a torque sensor;
the torque signal is indicative of the cyclical cogging torque; and
the controller varies the amount of the anti-cogging torque being provided to the rotatable shaft via the first and second magnetic members based on the cyclical cogging torque as indicated by the torque signal.

12. The apparatus of claim 7, further comprising a controller that controls and varies an amount of the anti-cogging torque provided to the rotatable shaft, wherein:
the controller receives a signal from an angular position sensor;
the signal from the angular position sensor is indicative of a position of the rotatable shaft; and
the controller varies the amount of the anti-cogging torque being provided to the rotatable shaft via the first and second magnetic members based on the signal from the angular position sensor.

13. The apparatus of claim 7, further comprising a controller that controls and varies an amount of the anti-cogging torque provided to the rotatable shaft, wherein the controller is configured to radially displace the second magnetic member relative to the first magnetic member to adjust the anti-cogging torque being provided to the rotatable shaft.

14. The apparatus of claim 7, wherein the first magnetic member is positioned relative to the second magnetic member such that the anti-cogging torque is equal to and opposite the cogging torque to cancel the cogging torque.

15. A system comprising:
the apparatus of claim 7; and
the internal combustion engine,
wherein one of the first magnetic member and the second magnetic member is mounted on the crankshaft of the internal combustion engine.

16. A method of improving rotation of a rotatable shaft about an axis, the rotatable shaft having a cyclical cogging torque acting thereon in a first direction, the method comprising:
rotating the shaft to cause relative rotation between a first magnetic member and a second magnetic member, wherein the second magnetic member is operable to magnetically interact with the first magnetic member; and
providing, via the magnetic interaction between the second magnetic member and the first magnetic member, an anti-cogging torque to the rotatable shaft in a second direction that opposes the first direction to at least partially offset the cyclical cogging torque,
wherein
the rotatable shaft is one of (i) a crankshaft, and (ii) a shaft of a camming system,
the cyclical cogging torque acting on the rotatable shaft is based on a varying parameter of a device, and
the device comprises the rotatable shaft.

17. The method of claim 16, further comprising selectively varying an amount of the anti-cogging torque provided to the rotatable shaft, wherein varying the amount of anti-cogging torque includes at least one of varying a distance between the first and second magnetic members and varying a magnetic flux of one of the first and second magnetic members.

18. The method of claim 16, further comprising selectively varying an amount of the anti-cogging torque provided to the rotatable shaft, wherein the cyclical cogging torque acting on the rotatable shaft is based on one of (i) a varying pressure within an engine cylinder, and (ii) varying biasing loads received from a biasing member by the rotatable shaft.

19. The method of claim 16, further comprising selectively varying an amount of the anti-cogging torque provided to the rotatable shaft, wherein:
   the rotatable shaft is an input shaft of a camming system of an internal combustion engine; and
   the cyclical cogging torque acting on the rotatable shaft is based on varying biasing loads received from a biasing member by the rotatable shaft.

20. The method of claim 16, further comprising:
   receiving a signal from a sensor, wherein the signal is indicative of one of (i) the cyclical cogging torque, and (ii) a position of the rotatable shaft;
   selectively varying an amount of the anti-cogging torque provided to the rotatable shaft; and
   varying the amount of the anti-cogging torque being provided to the rotatable shaft via the first and second magnetic members based on at least one of the (i) the signal from the sensor, and (ii) the cyclical cogging torque as indicated by the signal.

* * * * *